US012706883B2

(12) United States Patent
Schäfer et al.

(10) Patent No.: US 12,706,883 B2
(45) Date of Patent: Aug. 11, 2026

(54) OBSCURING PRIVATE NETWORK TOPOLOGIES FOR P2P GROUP CONFIGURATION USING ON-PREMISES PROXY SERVICES

(71) Applicant: Google LLC, Mountain View, CA (US)

(72) Inventors: Alexander Schäfer, Duesseldorf (DE); Christopher Probst-Ranly, Solingen (DE); Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/800,290

(22) Filed: Aug. 12, 2024

(65) Prior Publication Data

US 2026/0046274 A1 Feb. 12, 2026

(51) Int. Cl.
*H04L 9/40* (2022.01)

(52) U.S. Cl.
CPC ...... *H04L 63/0281* (2013.01); *H04L 63/0407* (2013.01); *H04L 63/0435* (2013.01)

(58) Field of Classification Search
CPC ............. H04L 63/0281; H04L 63/0407; H04L 63/0435
See application file for complete search history.

(56) References Cited

U.S. PATENT DOCUMENTS

| | | | | |
|---|---|---|---|---|
| 2012/0166656 | A1 * | 6/2012 | Asveren | H04L 63/029 709/228 |
| 2015/0019646 | A1 * | 1/2015 | George | H04L 65/1073 709/204 |
| 2016/0142467 | A1 * | 5/2016 | Ban | H04L 65/1045 709/219 |
| 2019/0379735 | A1 * | 12/2019 | Huang | H04L 67/1091 |
| 2020/0396279 | A1 * | 12/2020 | Vysotsky | H04L 61/256 |
| 2021/0058456 | A1 * | 2/2021 | Allen | H04N 21/2402 |
| 2022/0182444 | A1 | 6/2022 | Christensen | |
| 2023/0188562 | A1 * | 6/2023 | Cremon | H04L 63/0428 713/151 |
| 2023/0216947 | A1 * | 7/2023 | Bernardi | H04L 67/10 713/150 |
| 2024/0037192 | A1 * | 2/2024 | Bernardi | H04L 9/3297 |
| 2024/0056489 | A1 | 2/2024 | Bouazizi | |
| 2024/0121288 | A1 * | 4/2024 | Bouazizi | H04L 65/80 |
| 2024/0314241 | A1 * | 9/2024 | Willshire | H04M 3/5183 |

* cited by examiner

*Primary Examiner* — Techane Gergiso
(74) *Attorney, Agent, or Firm* — Lowenstein Sandler LLP

(57) ABSTRACT

A data item is provided to an on-premises proxy service by a peer-to-peer (P2P) client device associated with a video conferencing platform. The P2P client device and the on-premises proxy service are associated with a private network. The data item comprises topological information corresponding to the private network. A transformed version of the data item is received from the on-premises proxy service. The transformed version of the data item obscures the topological information corresponding to the private network. The transformed version of the data item is provided to an external tracking service for a P2P configuration operation. The external tracking service is associated with the video conferencing platform and is external to the private network.

20 Claims, 6 Drawing Sheets

OBSCURING PRIVATE NETWORK TOPOLOGIES FOR P2P GROUP CONFIGURATION USING ON-PREMISES PROXY SERVICES

TECHNICAL FIELD

Aspects and embodiments of the present disclosure relate to peer-to-peer (P2P) media delivery in private networks for video conferencing platforms, and in particular to obscuring private network topologies for P2P group configuration using on-premises proxy services.

BACKGROUND

Video conferencing platforms can use P2P techniques for improving delivery of content such as video and audio streams. Client devices in a P2P group can form links to other peers within the group to directly distribute content between peers. Such P2P networks can exhibit improved latency and reduced bandwidth requirements over other content delivery solutions such as a centralized distribution server.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some embodiment, a system and method are disclosed for obscuring private network topologies for P2P group configuration using on-premises proxy services. In an embodiment, a method includes providing, by a peer-to-peer (P2P) client device associated with a video conferencing platform, a data item to an on-premises proxy service. The P2P client device and the on-premises proxy service are associated with a private network. The data item comprises topological information corresponding to the private network. The method further includes receiving, from the on-premises proxy service, a transformed version of the data item. The transformed version of the data item obscures the topological information corresponding to the private network. The method further includes providing the transformed version of the data item to an external tracking service for a P2P configuration operation. The external tracking service is associated with the video conferencing platform and is external to the private network.

In an embodiment, the data item is an IP address of a private IP address range associated with the private network, the IP address is provided to the on-premises proxy service in association with an IP address resolution request, and the transformed version of the data item is a peering group ID corresponding to a set of peers in the private network. In an embodiment, a correspondence between the private IP address range and the peering group ID is defined in a configuration table stored within the private network.

In an embodiment, the data item is a Session Description Protocol (SDP) offer for a second P2P client device in the private network, and wherein the transformed version of the data item is an encrypted SDP offer. In an embodiment, the method further includes receiving, from the external tracking service, an encrypted SDP answer associated with the second P2P client device. The method further includes providing the encrypted SDP answer to the on-premises proxy service. The method further includes receiving a decrypted SDP answer from the on-premises proxy service.

In an embodiment, providing the data item to the on-premises proxy service includes using an API associated with the external tracking service. The on-premises proxy service conforms to the API.

In an embodiment, the method further includes, prior to providing the data item to the on-premises proxy service, requesting, from the external tracking service, an address of the on-premises proxy service, wherein the address corresponds to a private address range of the private network.

In some embodiments a computer-readable storage medium (which can be non-transitory computer-readable storage medium, although the disclosure is not limited to that) stores instructions which, when executed, cause a processing device to perform operations comprising a method according to any embodiment or aspect described herein.

In some embodiments a system comprises: a memory; and a processing device operatively coupled with the memory to perform operations comprising a method according to any embodiment or aspect described herein.

BRIEF DESCRIPTION OF DRAWINGS

Various embodiments in accordance with the present disclosure will be described with reference to the drawings, in which.

DETAILED DESCRIPTION

Figure 1:
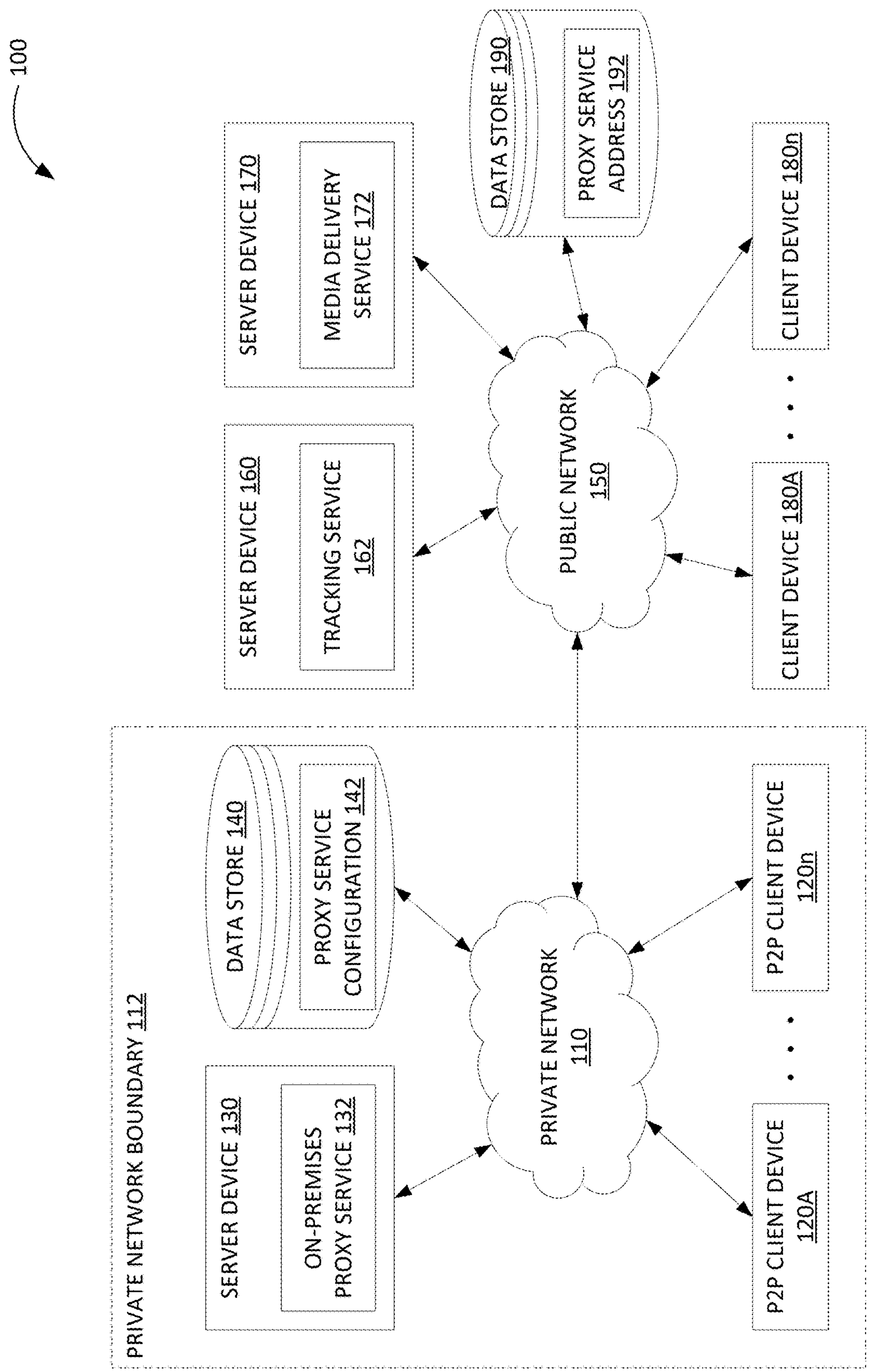
FIG. 1 is a block diagram of an example system architecture for a video conferencing platform that obscures private network topologies for P2P group configuration using on-premises proxy services, in accordance with an embodiment.

Aspects and embodiments of the present disclosure relate to peer-to-peer (P2P) media delivery in private networks for video conferencing platforms.

Video conferencing platforms can use P2P techniques for improving delivery of content such as video and audio streams. For example, a P2P tracking service of a video conferencing platform can identify a set of client devices within an enterprise network that are participating in the same video conference and configure the client devices in a P2P group. Once in a P2P group, the client devices can form links to other peers within the enterprise network to directly distribute content between peers. Such P2P networks can exhibit improved latency and reduced bandwidth requirements over other content delivery solutions such as streaming content to or from video conferencing platform servers outside the enterprise network.

The above-described systems can face several challenges relating to protecting internal network information while configuring P2P groups. Among these challenges are: (i) enabling a P2P tracking service of a video conferencing platform to implement a P2P group policy without requiring a private network administrator to divulge details of the private network topology to the video conferencing platform, (ii) enabling client devices to communicate their locations within the private network to the P2P tracking service without divulging their IP addresses, and (iii) enabling client devices to exchange P2P communications with peers via the P2P tracking service without divulging the client device or peer IP addresses.

First, a P2P tracking service of a video conferencing platform may be unable to implement a P2P group policy and coordinate client devices in a private network accordingly without the private network administrator first providing internal information about the private network topology to the video conferencing platform. For example, the private network administrator may need to provide a table of private network ranges that map private IP addresses to P2P groups to enable the P2P tracking service to implement a P2P group policy based on the provided table. Exporting such tables or similar information outside of the private network can conflict with security policies associated with the private network.

Second, client devices in the private network may be unable to provide necessary information to the P2P tracking service for establishing a P2P group without also providing the local IP addresses of the client devices or similar internal information to the video conferencing platform. For example, the P2P tracking service may need a client device's local IP address to look up the appropriate P2P group in a table of private network ranges as previously described. Exporting a client device's local IP address outside of the private network can similarly conflict with security policies.

Third, client devices in the private network may be unable to send or receive P2P configuration messages to/from peers in the private network via the P2P tracking service without also exposing the local IP addresses (or other internal information) of the client devices and peers to the video conferencing platform. For example, the client devices can exchange Session Description Protocol (SDP) offers and answers via the P2P tracking service, which can expose the contents of the SDP messages to the video conferencing platform. As with the previous challenges, exporting such internal information via SDP messages or similar protocols can conflict with security policies.

As a result of these challenges, video conference platforms and client devices may have to forgo P2P media delivery techniques in private networks to protect internal information related to the private network topologies. Client devices can thus experience increased latency and reduced bandwidth associated with client-server media delivery techniques where media streams are routed through the video conferencing platform. Video conferencing platforms can experience increased loads and associated costs (e.g., power, compute capacity, etc.) associated with client-server media delivery techniques.

Aspects of the present disclosure address the above challenges and other challenges by providing on-premises proxy services that enable P2P tracking services of video conferencing platforms to configure P2P groups in private networks without learning internal information about private network topologies. An example system can include one or more of the following components: (i) an on-premises proxy service that stores a mapping of internal identifiers to alternate identifiers and performs encryption/decryption of internal messages, (ii) client devices that resolve internal identifiers to alternate identifiers using an on-premises proxy service, and (iii) client devices that encrypt/decrypt internal messages using an on-premises proxy service. These components are further described below.

In an embodiment, an on-premises proxy service stores a mapping of internal identifiers associated with a private network (e.g., IP addresses or ranges) to an alternate P2P group identifier. The proxy service can conform to an application programming interface (API) associated with a P2P tracking service of a video conferencing platform such that the proxy service can be used in place of the P2P tracking service to resolve internal identifiers to P2P group identifiers. The proxy service can perform additional functions, such as encrypting and decrypting messages between client devices on the private network, where the messages contain internal information and are routed via the P2P tracking service.

In an embodiment, a client device of a video conferencing platform provides an internal identifier (e.g., an IP address) to an on-premises proxy service and receives an alternate P2P group identifier from the proxy service. The client device provides the P2P group identifier to the P2P tracking service, which the P2P tracking service can use to configure the client device into a P2P group in the private network. Thus, the internal identifier is obscured from the video conferencing platform.

In an embodiment, a client device of a video conferencing platform provides to an on-premises proxy service a P2P configuration message (e.g., an SDP offer or answer) addressed to a peer in the client device's private network. The client device receives an encrypted version of the message from the proxy service and provides the encrypted message to the P2P tracking service to send to the peer. The peer receives the encrypted message from the P2P tracking service, sends the encrypted message to the proxy service, and receives the decrypted message from the proxy service. Thus, any internal information related to the private network topology that is stored in the message is obscured from the video conferencing platform.

Accordingly, video conferencing platforms and client devices using these techniques can use more efficient P2P media delivery techniques within private networks while protecting internal information related to the private network topologies. Client devices can thus experience improved latency and increased bandwidth associated with P2P media delivery techniques. Video conferencing platforms can experience reduced loads and associated costs (e.g., power, compute capacity, etc.) compared to client-server media delivery techniques.

FIG. 1 is a block diagram of an example system architecture 100 for a video conferencing platform that obscures private network topologies for P2P group configuration using on-premises proxy services, in accordance with an embodiment. System architecture 100 (also referred to as "system" or "media platform" herein) includes private network 110, P2P client devices 120A-n, server device 130, data store 140, public network 150, and server device 160.

In various embodiments, system 100 can include more or fewer components in different configurations than those depicted in FIG. 1. For example, system 100 can include additional server machines, data stores, networks, etc.

Public network 150 can be accessible to various users and support any suitable applications that can be run or accessed by users, or for various other purposes. Public network 150 can be the Internet, for example. Public network 150 can include various nodes and networks such as LANs, WANs, wired networks (e.g., Ethernet), wireless networks (e.g., an 802.11 Wi-Fi network), cellular network (e.g., a 5G network), routers, hubs, switches, server computers, VMs, or a combination thereof. In various embodiments, public network 150 can include components for delivering media content of a video conferencing platform. For example, public network 150 can include one or more content delivery networks (CDNs).

Private network 110 can be dedicated to a specific group of users (e.g., an enterprise, a university, etc.) or configured for a specific purpose(s) (e.g., streaming, gaming, etc.). Private network 110 can include multiple nodes, such as computers, routers, switches, or other devices connected to the network. Each node can be associated with an IP address, a range of IP addresses, or similar topological information. In various embodiments, network topology information associated with private network 110 can be private, internal, classified, or otherwise restricted from being provided to nodes or users outside of private network 110. For example, an enterprise associated with private network 110 can have security policies that prevent export of such internal data. These security policies can be necessary for compliance with various government or industry regulations, contractual agreements, or similar. As depicted in FIG. 1, private network boundary 112 can indicate the extent of private network 110 and/or the limit beyond which topological information associated with private network 110 cannot pass (e.g., due to security policies or similar). Thus, public network 150 and server device 160 are not part of private network 110 and cannot be permitted to obtain internal data about the network topology of private network 110.

Each of server devices 130 and 160-170 can be a rackmount server, a router computer, a personal computer, a portable digital assistant, a mobile phone, a laptop computer, a tablet computer, a netbook, a desktop computer, a virtual machine (VM), etc., or any combination of the above. The computer system of FIG. 6 can be an example of a server device. In various embodiments, each of server devices 130 and 160-170 can be several computing devices, such as multiple rackmount servers in a data center(s) or multiple VMs in a cloud platform. In an embodiment, functions provided by server devices 160-170 can alternatively be provided by a single server device.

Data store 140 is a persistent storage that is capable of storing data local to private network 110, such as configuration data or similar. Data store 190 is a persistent storage that is capable of storing data for services of video conferencing system 100, such as media content or client tracking data. Data stores 140 and 190 can be hosted by one or more storage devices, such as main memory, magnetic or optical storage-based disks, tapes or hard drives, NAS, SAN, and so forth. In an embodiment, data stores 140 and 190 are network-attached file servers. In various embodiments, data stores 140 and 190 are some other type of persistent storage such as an object-oriented database, a relational database, and so forth. In an embodiment, data stores 140 and 190 are hosted on or are components of server devices 130 and/or 160-170.

P2P client devices 120A-n and client devices 180A-n can be personal computers (PCs), laptops, notebook computers, mobile phones, smartphones, tablet computers, digital assistants, network-connected televisions (e.g., smart TVs), or any other computing devices. The computer system of FIG. 6 can be an example of a client device. In various embodiments, P2P client devices 120A-n and client devices 180A-n can also be referred to as "user devices." P2P client devices 120A-n and client devices 180A-n can run an operating system (OS) that manages hardware and software of the client devices. P2P client devices 120A-n and client devices 180A-n can further include a web browser, application, or other software for participating in a video conference. P2P client devices 120A-n and client devices 180A-n can be used by users such as video conference participants. In an embodiment, a client device can be a conference room system, including, e.g., monitors, cameras, speakers, microphones, controller devices, and/or other components enabling users in the conference room to participate in a video conference. In general, and as described below, functions described in embodiments as being performed by a video conferencing platform and/or server devices 130 and 160-170 can also or alternatively be performed on P2P client devices 120A-n and client devices 180A-n in other embodiments. In addition, the functionality attributed to a particular component can be performed by different or multiple components operating together.

Video conferencing system 100 can provide various media delivery modes, such as a client-server media delivery mode and a P2P media delivery mode. In a client-server media delivery mode, media delivery service 172 of server device 170 receives media content from a client device of P2P client devices 120A-n and client devices 180A-n and delivers the media content to one or more of the remaining client devices for presentation to their respective users (e.g., in a layout showing media streams from all video conference participants). A client-server media delivery mode can be associated with increased latency experienced by users and increased load on server device 170 due to all media streams passing through media delivery service 172. However, a client-server media delivery mode can be easier to configure because client devices do not communicate with each other directly and only communicate with media delivery service 172. A client-server media delivery mode can be used when participating client devices are connected to different networks, such as P2P client device 120A and client device 180A.

In a P2P media delivery mode, client devices form direct connections to each other and deliver media content to each other without a server as an intermediary. For example, P2P client devices 120A-n can form a P2P network within private network 110 and deliver media content to peer devices without using media delivery service 172. A P2P delivery mode can be associated with decreased latency and decreased server load due to the distributed nature of P2P media delivery. However, a P2P media delivery mode can include additional configuration to make P2P client devices 120A-n aware of each other and initiate P2P communication.

To configure P2P networks for peer groups participating in a video conference, video conferencing system 100 includes tracking service 162 of server device 160. Tracking service 162 identifies individual P2P client devices and determines to which peer group each respective P2P client device belongs. For example, tracking service 162 can receive an IP address from a P2P client device and determine a peer group using a look-up table mapping IP address ranges to peer groups. Such look-up tables can be provided by an administrator of private network 110 to tracking service 162 and stored external to private network 110, such as in data store 190. Tracking service 162 can subsequently mediate initial SDP exchanges between P2P client devices. For example, tracking service 162 can receive an SDP offer or answer from one P2P client device, identify the recipient P2P client device from the SDP message, and deliver the offer/answer to the recipient.

As previously described, the above configuration steps for a P2P media delivery mode can cause internal data associated with the network topologies of private networks to be divulged to the video conferencing platform. For example, in the above configuration scenario, internal data such as IP address ranges, IP addresses of individual P2P client devices, and contents of SDP offers/answers are divulged to tracking service 162 outside private network 110 in order to enable a P2P media delivery mode. Thus, a P2P media delivery mode using the above configuration scenario can be unavailable for some P2P client devices due to security policies in the P2P client devices'private network.

In another P2P media delivery mode, configuration of P2P client devices 120A-n can be performed by tracking service 162 in association with on-premises proxy service 132 of server device 130 to obscure internal data related to the network topology of private network 110, and thus prevent the internal data from being divulged to tracking service 162. An administrator of private network 110 can provide, develop, and/or install on-premises proxy service 132 within private network 110. On-premises proxy service 132 can provide various endpoints that transform internal data items to exportable data items that can be exported outside private network 110 without divulging topological information. Proxy service configuration 142 can be configured by the administrator and can provide data relevant to the various transformations performed by on-premises proxy service 132. Example transformation endpoints are further described with reference to FIG. 2.

In the above security-aware P2P media delivery mode, P2P client devices 120A-n can begin the configuration process as they would in the non-security-aware P2P media delivery mode previously described by initiating communication with tracking service 162. Tracking service 162 can provide P2P client devices 120A-n with an address or other identifier for on-premises proxy service 132, which can be provided by the administrator and stored at proxy service address 192 in data store 190. P2P client devices 120A-n can then communicate with proxy service 132 to obtain transformed versions of internal data items to be provided to tracking service 162. Example communication sequences between P2P client devices 120A-n, on-premises proxy service 132, and tracking service 162 are further described with reference to FIGS. 3-4.

Further to the descriptions above, a user (e.g., an administrator or a user of client devices 120A-n or 180A-n) may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
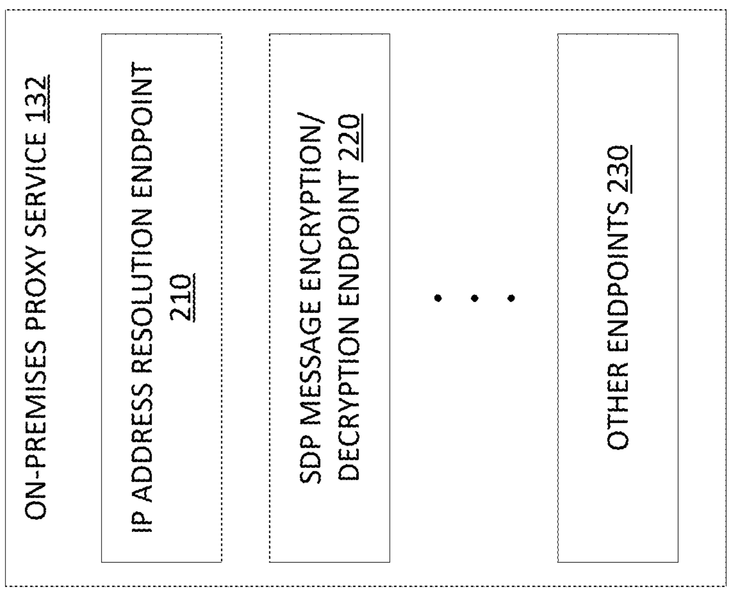
FIG. 2 is a block diagram of an example on-premises proxy service, in accordance with an embodiment.

FIG. 2 is a block diagram of an example on-premises proxy service 132, in accordance with an embodiment. On-premises proxy service 132 includes IP address resolution endpoint 210 and SDP message encryption/decryption endpoint 220. In various embodiments, on-premises proxy service 132 can include more, fewer, or different endpoints than those depicted in FIG. 2. For example, one of endpoints 210 or 210 can be absent, or additional endpoints such as other endpoints 230 can be included. Endpoints 210-230 can correspond to respective APIs, such as REST APIs or similar. In an embodiment, one or more of the APIs can conform to respective APIs of the video conferencing system (e.g., of tracking service 162).

IP address resolution endpoint 210 can be associated with a mapping of internal IP addresses or ranges to alternate P2P group identifiers. The mapping can be stored, for example, in proxy service configuration 142 of FIG. 1. IP address resolution endpoint 210 can be used in place of tracking service 162 to resolve IP addresses to P2P group identifiers. A client device of P2P client devices 120A-n can provide its IP address to IP address resolution endpoint 210 and receive a P2P group identifier from IP address resolution endpoint 210. The client device can then provide the P2P group identifier to tracking service 162.

SDP message encryption/decryption endpoint 220 can be associated with encryption and decryption functions for SDP messages that contain internal information such as IP addresses. SDP message encryption/decryption endpoint 220 can be used before and after sending SDP messages to peers via tracking service 162 to encrypt and decrypt SDP messages to protect internal information. A client device of P2P client devices 120A-n can provide an SDP message to SDP message encryption/decryption endpoint 220 and receive an encrypted version of the message from SDP message encryption/decryption endpoint 220. The client device can provide the encrypted message to tracking service 162 to send to a peer. The peer receives the encrypted message from tracking service 162, sends the encrypted message to SDP message encryption/decryption endpoint 220, and receives the decrypted message from the SDP message encryption/decryption endpoint 220.

Figure 3:
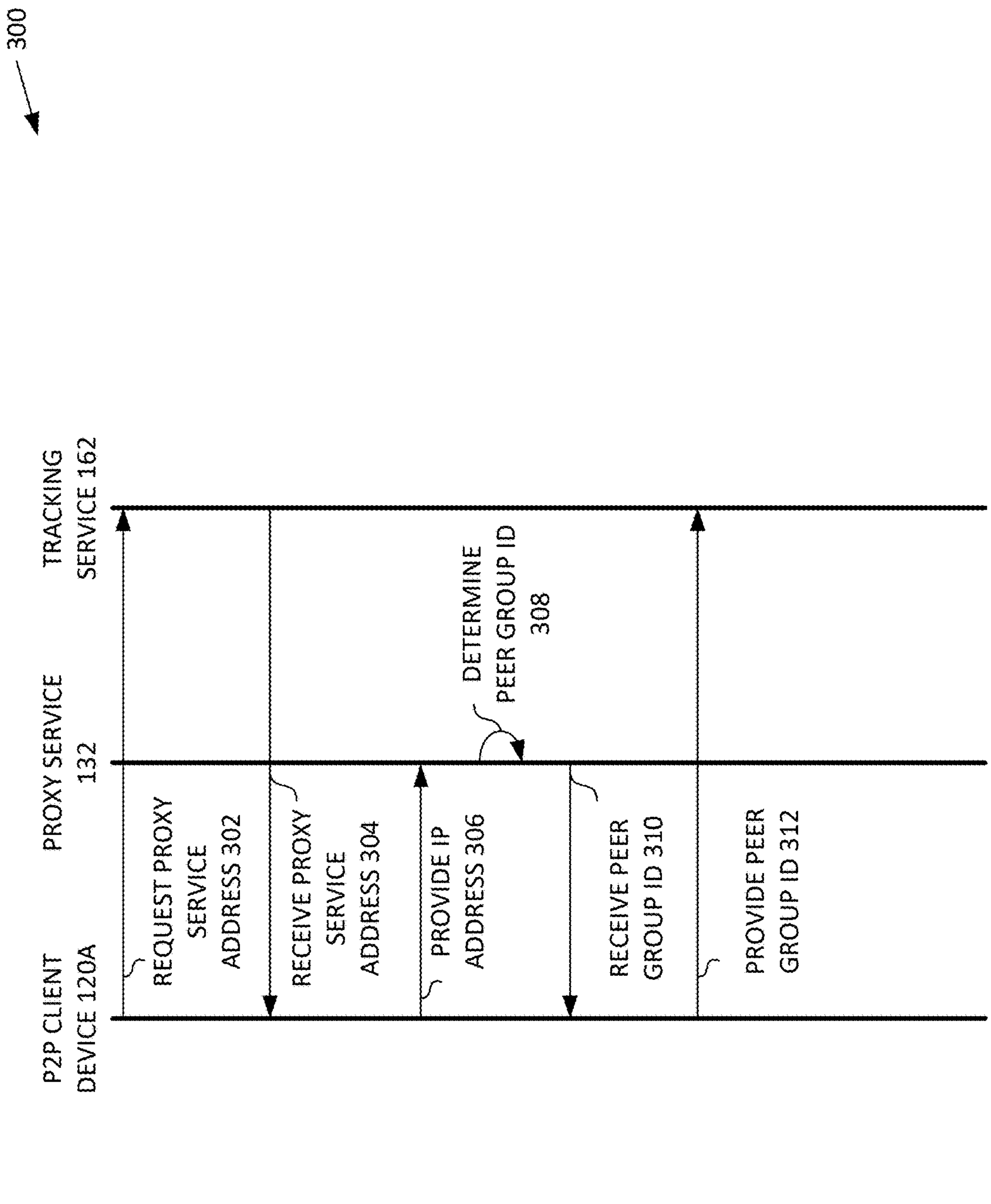
FIG. 3 is a sequence diagram of an example interaction between a P2P client device, an on-premises proxy service, and a tracking service to obscure IP address information for P2P group configuration using on-premises proxy services, in accordance with an embodiment.

FIG. 3 is a sequence diagram of an example interaction 300 between P2P client device 120A, on-premises proxy service 132, and tracking service 162 to obscure IP address information for P2P group configuration using on-premises proxy services, in accordance with an embodiment. In some embodiments, operations depicted in FIG. 3 could occur in a different order or be performed by different components than depicted. Various embodiments can include additional operations or components not depicted in FIG. 3 or a subset of operations or components depicted in FIG. 3. The operations depicted in FIG. 3 can correspond to different communication sessions or different timing intervals. For example, some operations can proceed in immediate succession or can be part of a single communication session, while other operations can be spread out over time or can be part of different communication sessions.

At operation 302, P2P client device 120A requests an address of on-premises proxy service 132 from tracking service 162. As described with reference to FIG. 1, an administrator of private network 110 can assign an IP address to on-premises proxy service 132 for providing the various endpoints referenced in FIG. 2. The administrator can provide the IP address to tracking service 162, which can store the IP address locally and provide it to P2P client devices upon request. In an embodiment, the administrator can provide the IP address through a web portal for configuring a video conferencing platform. At operation 304, P2P client device 120A receives the address of on-premises proxy service 132 from tracking service 162.

At operation 306, P2P client device 120A provides its local IP address to proxy service 132. Operation 306 can occur fully within private network 110 so that the local IP address is not divulged outside private network 110. At operation 308, on-premises proxy service 132 determines a peer group ID for P2P client device 120A using the provided IP address. In an embodiment, on-premises proxy service 132 determines the peer group ID using a look-up table or similar mapping of IP addresses/address ranges to peer groups. Such mappings can be provided to on-premises proxy service 132 by the administrator and can be stored within private network 110 so that the mappings are not divulged outside private network 110. In an embodiment, on-premises proxy service 132 determines the peer group ID dynamically based on various static or dynamic characteristics of the P2P client device and/or the private network. For example, on-premises proxy service 132 can determine the peer group ID based on the P2P client device's IP address, physical location, measured latency or bandwidth, device type, or similar. At operation 310, P2P client device 120A receives the peer group ID from on-premises proxy service 132. In an embodiment, providing and receiving the peer group ID in operations 306 and 310 occurs via an API of on-premises proxy service 132 that conforms to an API of tracking service 162. Thus, a P2P client device can use a uniform interface to receive peer group IDs from on-premises proxy service 132 or tracking service 162 depending on whether or not the P2P client device is located within the private network (e.g., the P2P client device can move in or out of the private network at various times).

At operation 312, P2P client device 120A provides the peer group ID to tracking service 162. Tracking service 162 can proceed to use the provided peer group ID in place of an IP address to configure P2P client device 120A and other P2P client devices in a P2P network for a video conference. The IP address is thus obscured from tracking service 162 and other nodes outside of the private network.

Figure 4:
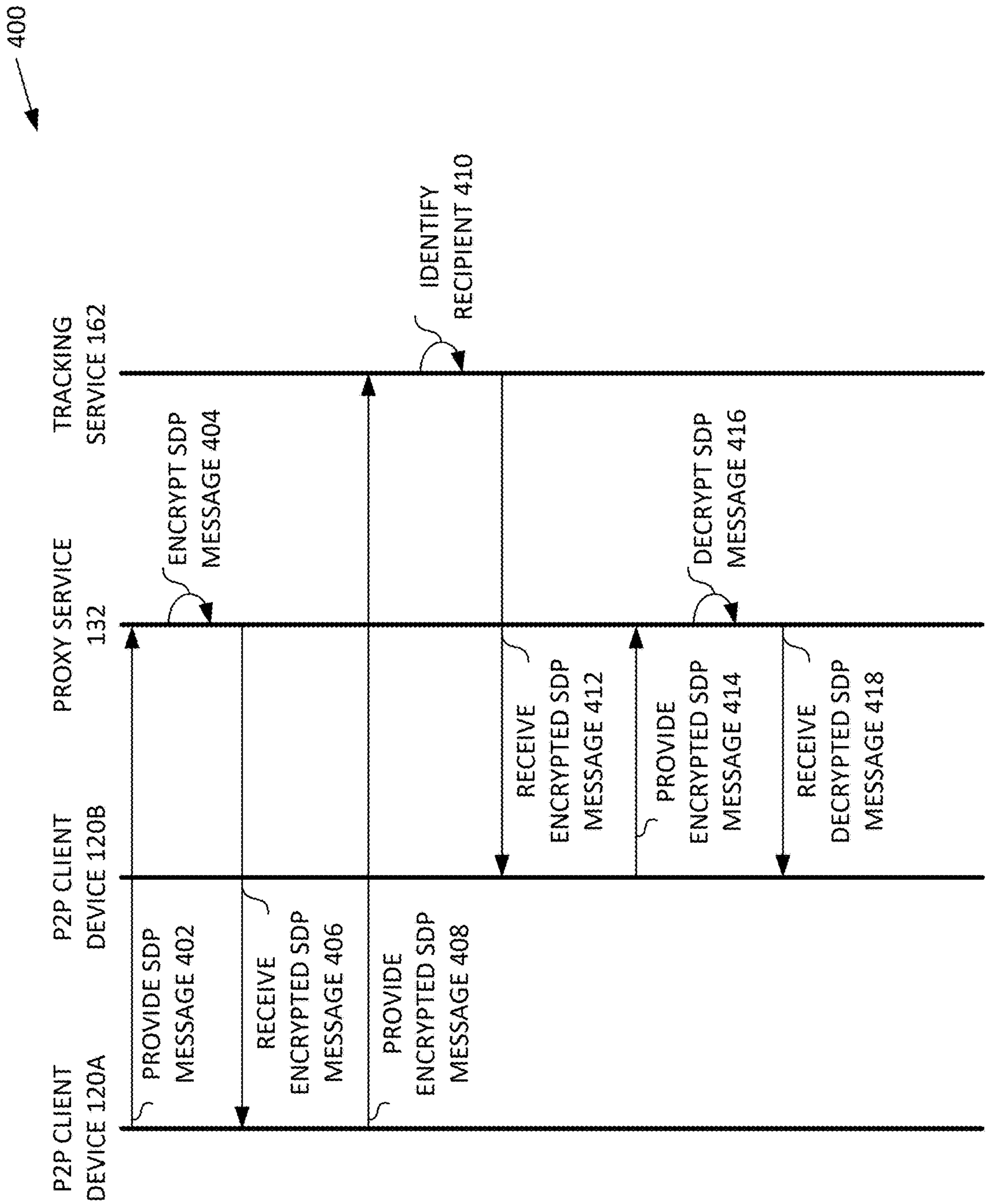
FIG. 4 is a sequence diagram of an example interaction between a first P2P client device, a second P2P client device, an on-premises proxy service, and a tracking service to obscure SDP message information for P2P group configuration using on-premises proxy services, in accordance with an embodiment.

FIG. 4 is a sequence diagram of an example interaction 400 between P2P client device 120A, P2P client device 120B, on-premises proxy service 132, and tracking service 162 to obscure SDP message information for P2P group configuration using on-premises proxy services, in accordance with an embodiment. In some embodiments, operations depicted in FIG. 4 could occur in a different order or be performed by different components than depicted. Various embodiments can include additional operations or components not depicted in FIG. 4 or a subset of operations or components depicted in FIG. 4. For example, interaction 400 can include operations 302-304 of FIG. 3 to identify the address of on-premises proxy service 132 prior to operation 402. The operations depicted in FIG. 4 can correspond to different communication sessions or different timing intervals. For example, some operations can proceed in immediate succession or can be part of a single communication session, while other operations can be spread out over time or can be part of different communication sessions.

At operation 402, P2P client device 120A provides an SDP message to proxy service 132. The SDP message can be an SDP offer or SDP answer, for example. Operation 402 can occur fully within private network 110 so that the contents of the SDP message are not divulged outside private network 110. At operation 404, on-premises proxy service 132 encrypts the SDP message. In various embodiments, encrypting the SDP message can include encrypting the message contents, encrypting the SDP message header or other metadata, replacing sections of the SDP message using a look-up table (e.g., replacing a recipient IP address with another unique recipient ID), or using other types of encryption or obfuscation techniques. Such techniques can be provided or selected by the administrator and/or mandated by security policies associated with private network 110. At operation 406, P2P client device 120A receives the encrypted SDP message from on-premises proxy service 132. In an embodiment, providing the SDP message and receiving the encrypted SDP message in operations 402 and 406 occurs via an API of on-premises proxy service 132 that conforms to an API of tracking service 162, as previously described.

At operation 408, P2P client device 120A provides the encrypted SDP message to tracking service 162. At operation 410, tracking service 162 identifies the recipient of the encrypted SDP message. At operation 412, P2P client device 120B receives the encrypted SDP message from tracking service 162. Because relevant parts of the SDP message are encrypted, internal data related to the private network topology do not pass out of private network 110 in a plaintext format to tracking service 162 during operations 408-412.

At operation 414, P2P client device 120B provides the encrypted SDP message to proxy service 132. At operation 416, on-premises proxy service 132 decrypts the SDP message. In various embodiments, on-premises proxy service 132 obtains the original plaintext SDP message using techniques complementary to the various encryption and obfuscation techniques described above. At operation 418, P2P client device 120B receives the decrypted (plaintext) SDP message from on-premises proxy service 132. Operation 418 can occur fully within private network 110 so that the decrypted SDP message is not divulged outside private network 110. In an embodiment, providing the encrypted SDP message and receiving the decrypted SDP message in operations 414 and 418 occurs via an API of on-premises proxy service 132 that conforms to an API of tracking service 162, as previously described.

In an embodiment, on-premises proxy service 132 includes an SDP message cache and SDP message placeholder generation component. Rather than encrypt the SDP message at operation 404, on-premises proxy service 132 can store the original SDP message and replace it with a placeholder message. The placeholder message can include a unique identifier (or similar technique) referencing the stored message. The placeholder message can be delivered via tracking service 162 as previously described. At operation 416, rather than decrypt the encrypted SDP message, on-premises proxy service 132 can retrieve the original SDP message using the placeholder reference.

Figure 5:
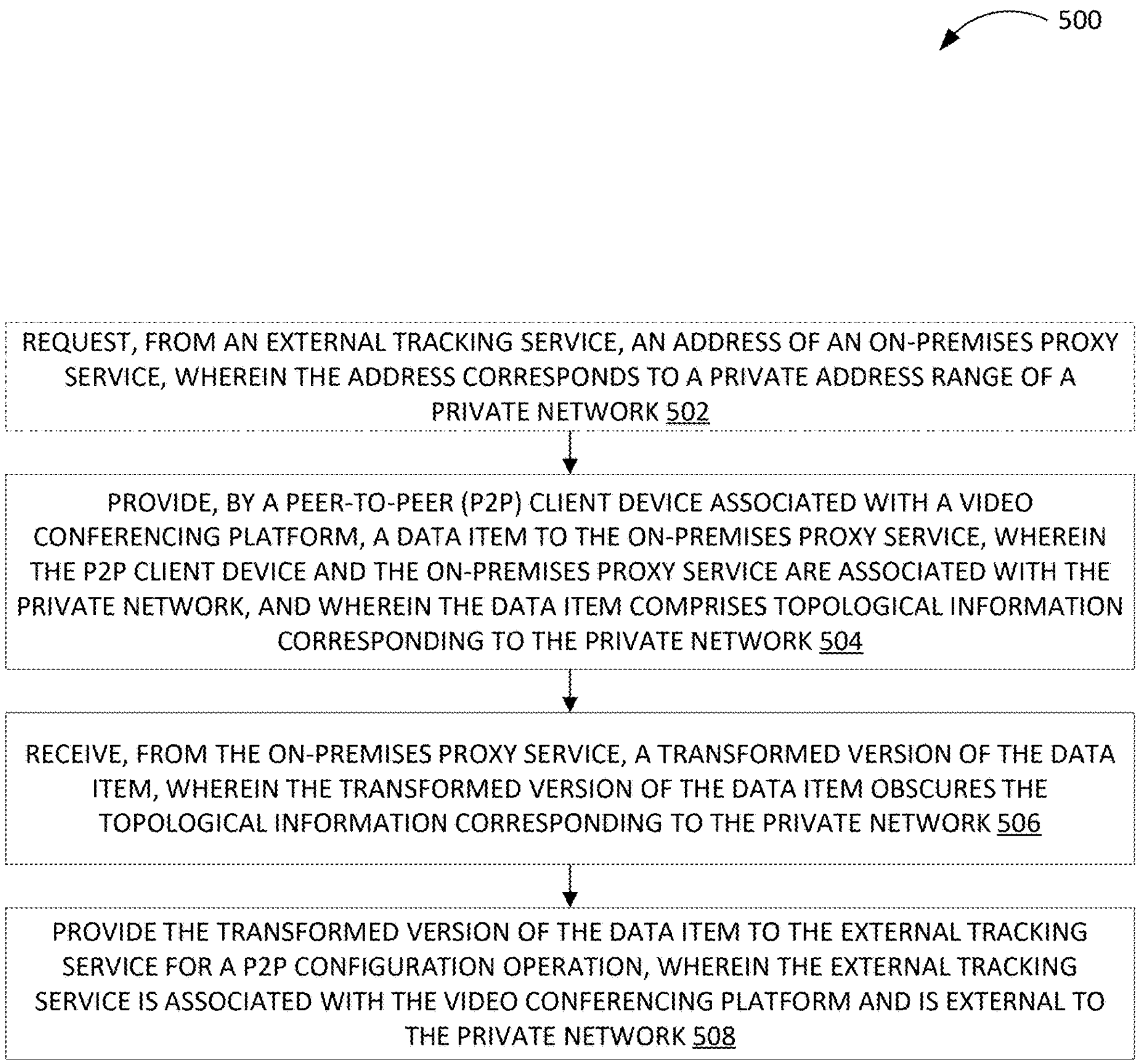
FIG. 5 is a flow diagram of an example method for obscuring private network topologies for P2P group configuration using on-premises proxy services, in accordance with an embodiment.

FIG. 5 is a flow diagram of an example method 500 for obscuring private network topologies for P2P group configuration using on-premises proxy services, in accordance with an embodiment. Method 500 can be performed by processing logic that can comprise hardware (e.g., circuitry, dedicated logic, etc.), computer-readable instructions such as software or firmware (e.g., run on a general-purpose computing system or a dedicated machine), or a combination thereof. For instance, an example system can include a memory and a processing device coupled to the memory device to perform operations comprising the blocks of method 500. Method 500 can also be associated with a set of instructions stored on a non-transitory computer-readable medium (e.g., magnetic or optical disk, etc.). The instructions, when executed by a processing device, can cause the processing device to perform operations comprising the blocks of method 500. In at least one embodiment, method 500 is performed by one or more of server devices 130 or 160-170, or client devices 120A-n or 180A-n of FIG. 1, or components thereof. In at least one embodiment, method 500 is performed by computing system 600 of FIG. 6. In some embodiments, blocks depicted in FIG. 5 could be performed simultaneously or in a different order than depicted. Various embodiments can include additional blocks not depicted in FIG. 5 or a subset of blocks depicted in FIG. 5. For example, blocks depicted with a dashed outline (e.g., block 502) can be absent in an embodiment.

At block 502, processing logic requests, from an external tracking service, an address of an on-premises proxy service, wherein the address corresponds to a private address range of a private network. In an embodiment, the external tracking service is tracking service 162, the on-premises proxy service is on-premises proxy service 132, and the private network is private network 110. In an embodiment, block 502 corresponds to operations 302-304 of FIG. 3. As previously described, the address can be provided to the external tracking service by an administrator of the private network (e.g., through a web portal). The address can be stored at a data store associated with the tracking service (e.g., data store 190).

At block 504, the processing logic provides, by a P2P client device associated with a video conferencing platform, a data item to the on-premises proxy service, wherein the P2P client device and the on-premises proxy service are associated with the private network, and wherein the data item comprises topological information corresponding to the private network. In an embodiment, the P2P client device is P2P client device 120A.

In an embodiment, providing the data item to the on-premises proxy service comprises using an API associated with the external tracking service. The on-premises proxy service conforms to the API such that a P2P client device can adapt to using either the external tracking service or the on-premises proxy service for various protocols depending on security policies or other requirements/restrictions associated with the private network.

At block 506, the processing logic receives, from the on-premises proxy service, a transformed version of the data item, wherein the transformed version of the data item obscures the topological information corresponding to the private network.

In an embodiment, the data item is an IP address of a private IP address range associated with the private network. The IP address can be the local IP address of the P2P client device. The IP address is provided to the on-premises proxy service in associated with an IP address resolution request. The IP address resolution request can be part of a configuration sequence for a video conferencing P2P network, such as interaction 300 of FIG. 3. The transformed version of the data item is a peering group ID corresponding to a set of peers in the private network. In an embodiment, a correspondence between the private IP address range and the peering group ID is defined in a configuration table stored within the private network. For example, the correspondence can be defined in a look-up table provided by an administrator of the private network.

In an embodiment, the data item is an SDP offer for a second P2P client device in the private network. The second P2P client device can be P2P client device 120B, for example. The transformed version of the data item is an encrypted SDP offer. Some or all of the SDP offer can be encrypted in various embodiments, and other obfuscation or substitution techniques such as those described with reference to FIG. 4 can be used in place of encryption.

At block 508, the processing logic provides the transformed version of the data item to the external tracking service for a P2P configuration operation, wherein the external tracking service is associated with the video conferencing platform and is external to the private network.

In an embodiment, where the data item is an SDP offer as described above, method 500 can further include receiving, from the external tracking service, an encrypted SDP answer associated with the second P2P client device. The processing logic provides the encrypted SDP answer to the on-premises proxy service and receives a decrypted SDP answer from the on-premises proxy service.

In an embodiment, the data item can be associated with another protocol or another type of communication besides the IP address resolution and SDP exchange described above. The on-premises proxy service can provide one or more endpoints to support one or more of the protocols and types of communication.

Figure 6:
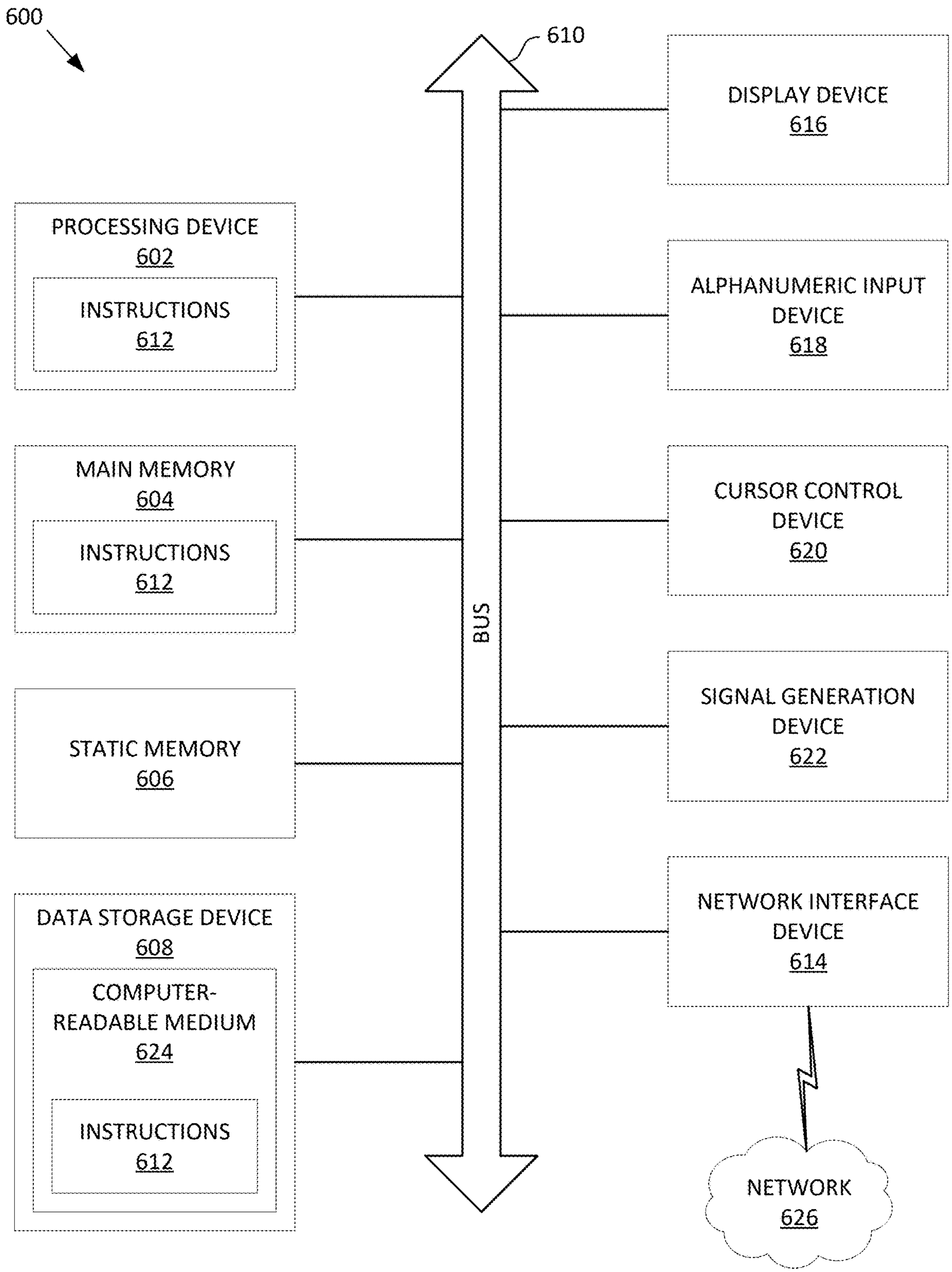
FIG. 6 illustrates an example computer system, in accordance with at least one embodiment.

FIG. 6 is a block diagram illustrating an example computer system 600, in accordance with embodiments of the present disclosure. Computer system 600 can correspond to server machines 110-140 or client devices 150A-n, as described with reference to FIG. 1. Computer system 600 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 600 includes processing device 602 (e.g., one or more processors or cores), main memory 604 (e.g., read-only memory (ROM), flash memory, dynamic random access memory (DRAM) such as synchronous DRAM (SDRAM), double data rate (DDR SDRAM), or DRAM (RDRAM), etc.), static memory 606 (e.g., flash memory, static random access memory (SRAM), etc.), and data storage device 608, which communicate with each other via bus 610.

Processing device 602 represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. Processing device 602 is configured to execute instructions 612 (e.g., for generating customized lyric captions using machine learning models) for performing the operations discussed herein.

Computer system 600 can further include network interface device 614. Computer system 600 also can include display device 616 (e.g., a liquid crystal display (LCD) or a cathode ray tube (CRT)), alphanumeric input device 618 (e.g., a keyboard, and alphanumeric keyboard, a motion sensing input device, touch screen), cursor control device 620 (e.g., a mouse), and signal generation device 622 (e.g., a speaker). In some embodiments, computer system 600 may not include display device 616, alphanumeric input device 618, and/or cursor control device 620 (e.g., in a headless configuration).

Data storage device 608 can include a non-transitory machine-readable storage medium 624 (also computer-readable storage medium) on which is stored one or more sets of instructions 612 (e.g., for generating customized lyric captions using machine learning models) embodying any one or more of the methodologies or functions described herein. Instructions 612 can also reside, completely or at least partially, within main memory 604 or within the processing device 602 during execution thereof by computer system 600, main memory 604 and processing device 602 also constituting machine-readable storage media. Instructions 612 can further be transmitted or received over network 626 via network interface device 614.

In one implementation, instructions 612 include instructions for generating customized lyric captions using machine learning models, as described herein. While computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

requesting, from an external service associated with a video conferencing platform, an address of an on-premises proxy service, wherein the address corresponds to a private address range of a private network, and wherein the external service is external to the private network;

providing, by a peer-to-peer (P2P) client device associated with the video conferencing platform, a data item to the on-premises proxy service, wherein the P2P client device and the on-premises proxy service are part of the private network, and wherein the data item comprises topological information corresponding to the private network;

receiving, from the on-premises proxy service, a transformed version of the data item, wherein the transformed version of the data item obscures the topological information corresponding to the private network; and providing the transformed version of the data item to the external tracking service for a P2P configuration operation.

2. The method of claim 1, wherein the data item is an IP address of a private IP address range associated with the private network, wherein the IP address is provided to the on-premises proxy service in association with an IP address resolution request, and wherein the transformed version of the data item is a peering group ID corresponding to a set of peers in the private network.

3. The method of claim 2, wherein a correspondence between the private IP address range and the peering group ID is defined in a configuration table stored within the private network.

4. The method of claim 1, wherein the data item is a Session Description Protocol (SDP) offer for a second P2P client device in the private network, and wherein the transformed version of the data item is an encrypted SDP offer.

5. The method of claim 4, further comprising:

receiving, from the external service, an encrypted SDP answer associated with the second P2P client device;

providing the encrypted SDP answer to the on-premises proxy service; and receiving a decrypted SDP answer from the on-premises proxy service.

6. The method of claim 1, wherein providing the data item to the on-premises proxy service comprises using an API associated with the external service, wherein the on-premises proxy service conforms to the API.

7. The method of claim 6, wherein:

requesting the address of the on-premises proxy service is performed prior to providing the data item to the on-premises proxy service.

8. A system comprising:

a memory device; and a processing device coupled to the memory device, the processing device to perform operations comprising:

requesting, from an external service associated with a video conferencing platform, an address of an on-premises proxy service, wherein the address corresponds to a private address range of a private network, and wherein the external service is external to the private network;

providing, by a peer-to-peer (P2P) client device associated with the video conferencing platform, a data item to the on-premises proxy service, wherein the P2P client device and the on-premises proxy service are are part of the private network, and wherein the data item comprises topological information corresponding to the private network;

receiving, from the on-premises proxy service, a transformed version of the data item, wherein the transformed version of the data item obscures the topological information corresponding to the private network; and providing the transformed version of the data item to the external tracking service for a P2P configuration operation.

9. The system of claim 8, wherein the data item is an IP address of a private IP address range associated with the private network, wherein the IP address is provided to the on-premises proxy service in association with an IP address resolution request, and wherein the transformed version of the data item is a peering group ID corresponding to a set of peers in the private network.

10. The system of claim 9, wherein a correspondence between the private IP address range and the peering group ID is defined in a configuration table stored within the private network.

11. The system of claim 8, wherein the data item is a Session Description Protocol (SDP) offer for a second P2P client device in the private network, and wherein the transformed version of the data item is an encrypted SDP offer.

12. The system of claim 11, the operations further comprising:

receiving, from the external tracking service, an encrypted SDP answer associated with the second P2P client device;

providing the encrypted SDP answer to the on-premises proxy service; and receiving a decrypted SDP answer from the on-premises proxy service.

13. The system of claim 8, wherein providing the data item to the on-premises proxy service comprises using an API associated with the external service, wherein the on-premises proxy service conforms to the API.

14. The system of claim 13, wherein:

requesting the address of the on-premises proxy service is performed prior to providing the data item to the on-premises proxy service.

15. A non-transitory computer-readable medium comprising instructions that, when executed by a processing device, cause the processing device to perform operations comprising:

requesting, from an external service associated with a video conferencing platform, an address of an on-premises proxy service, wherein the address corresponds to a private address range of a private network, and wherein the external service is external to the private network;

providing, by a peer-to-peer (P2P) client device associated with the video conferencing platform, a data item to the on-premises proxy service, wherein the P2P client device and the on-premises proxy service are part of the private network, and wherein the data item comprises topological information corresponding to the private network;

receiving, from the on-premises proxy service, a transformed version of the data item, wherein the transformed version of the data item obscures the topological information corresponding to the private network; and providing the transformed version of the data item to the external tracking service for a P2P configuration operation.

16. The non-transitory computer-readable medium of claim 15, wherein the data item is an IP address of a private IP address range associated with the private network, wherein the IP address is provided to the on-premises proxy service in association with an IP address resolution request, and wherein the transformed version of the data item is a peering group ID corresponding to a set of peers in the private network.

17. The non-transitory computer-readable medium of claim 16, wherein a correspondence between the private IP address range and the peering group ID is defined in a configuration table stored within the private network.

18. The non-transitory computer-readable medium of claim 15, wherein the data item is a Session Description Protocol (SDP) offer for a second P2P client device in the private network, and wherein the transformed version of the data item is an encrypted SDP offer.

19. The non-transitory computer-readable medium of claim 18, the operations further comprising:

receiving, from the external service, an encrypted SDP answer associated with the second P2P client device;

providing the encrypted SDP answer to the on-premises proxy service; and receiving a decrypted SDP answer from the on-premises proxy service.

20. The non-transitory computer-readable medium of claim 15, wherein providing the data item to the on-premises proxy service comprises using an API associated with the external service, wherein the on-premises proxy service conforms to the API.

* * * * *